Dec. 31, 1957  L. A. NIEMANN  2,818,341
RECONSTITUTED POWDERED MILK PRODUCTS
AND METHOD AND DEVICE THEREFOR
Filed June 17, 1953

INVENTOR.
LAWRENCE A. NIEMANN
BY Jerome A. Gross,
Atty.

United States Patent Office 2,818,341
Patented Dec. 31, 1957

2,818,341

RECONSTITUTED POWDERED MILK PRODUCTS AND METHOD AND DEVICE THEREFOR

Lawrence A. Niemann, Litchfield, Ill., assignor to Milnot Company, Litchfield, Ill., a corporation of Michigan Application June 17, 1953, Serial No. 364,171

6 Claims. (Cl. 99—63)

This invention relates to the reconstitution of powdered milk with fluids, such as water, fluid whole milk, fluid skim milk or partially evaporated milk, and is directed particularly to the production in commercial quantities of reconstituted milk products having such a degree of concentration, uniformity and freedom from sedimentation and bacterial growth as to be commercially acceptable as equivalents of evaporated or condensed milk products.

Further purposes include:

Development of a method for reconstituting powdered milk at "holding temperature" for dairy products, sufficiently low to inhibit the growth of bacteria;

Separating the milk powder into particles by lifting the powder in a partial vacuum, and avoiding the formation of doughy aggregations of undissolved milk powder;

Avoiding manual agitation and foaming of the reconstituted product, and the spreading of milk powder as dust, by performing the process in an ejector-like closed system in the absence of air;

Effecting both the separation of the milk powder into particles and the mixing of the particles with the fluid by means of a jet stream created in a suction T;

Carrying out such reconstitution process either as a batch process or as a continuous production process; and Providing a simple, inexpensive device for carrying on the process and achieving the products of this invention.

In carrying out the foregoing objects, the present invention utilizes certain new principles not heretofore known or used in the dairy industry, including the following:

Powdered milk may be reconstituted with a fliud at "holding temperature," on a commercial scale and without mechanically applied agitation.

Particles of powdered milk may be separated from each other by lifting them in a partial vacuum against the force of gravity acting upon them.

Particles so lifted and separated may be presented to the cold fluid and entrained in it along a high velocity jet which impinges upon the particles, entrains them uniformly dispersed and mixes them at once into stable solution.

The mixing may be carried out in a closed system, free from contamination even by air, and no foaming will result.

By applying constant pressure to the fluid stream, the rate of admixture of powdered milk particles may be kept at a constant predetermined level. This makes possible the use of a continuous process, without recirculation, for the manufacture of milk products of certain degrees of concentration.

A simple application of the process of this invention, and typical of the products thereof, is a reconstituted mixture of 90% cold skim milk and 10% nonfat milk powder, having properties equivalent to evaporated skim milk.

Another typical product of the invention, substantially indistinguishable from the first mentioned, is a reconstituted mixture of 20% nonfat milk powder and 80% cold water. The following summarization of the process refers specifically to the first product, but its application to the other products of invention herein will be apparent.

A batch of skim milk is reduced to holding temperature of 40° F. At this temperature the growth of bacteria is inhibited, and to carry on operations at such temperature is an approved conservative practice in the dairy industry. However, it has not heretofore been thought possible to combine powdered milk with fluids of such low temperature, on a commercial scale; the practice has been to elevate the temperature to 100° or 110° F. for the purpose of increasing the supposed solubility of the mixture.

Returning to the present process, such skim milk may be put under pressure and forced through a nozzle so that it emerges as a jet stream in the chamber of a suction T. The effect of the nozzle is to accelerate greatly the flow of the fluid and reduce its static pressure below atmospheric pressure, creating suction within the T. To the suction inlet of the T is attached one end of a tube, whose other end may be inserted into a container of milk powder, the powder within the container being subjected to atmospheric pressure. Suction created by the fluid jet stream within the suction T draws the milk powder into the suction tube, raising the powder particles against the resistance of gravity and thus tending to separate them from each oher. The pressure difference between the suction within the T and the atmospheric pressure conveys such particles into the suction T around the jet stream emerging from the nozzle.

As the jet stream emerges from the nozzle at high velocity, and gradually broadens, it envelops and entrains the milk powder particles, agitating them violently and bringing them into solution without mechanical mixing. No air being present, save for the minute quantities of air which may have been in the powder container, there is no foaming. The product emerges perfectly reconstituted. If canned and sterilized, it may be left on the shelf for as many months as evaporated skim milk, with no greater sedimentation; that is, without any deposit of powder out of solution onto the container bottom.

Where there is a proper balance between pressure on the fluid, height of lift from the milk powder container, and nozzle characteristics, the only attention required is to keep the end of the suction tube buried in the powder container. So regular is the rate of mixture that where such balance is achieved, the mixture emerging from the suction T may be at the desired standard of concentration, e. g., 20% solids not fat in the case being discussed. With such standard achieved, there need be no recirculation of the mixture.

However, for many purposes the use of a batch tank will add to the convenience of the operation. A predetermined quantity of the cold fluid may be placed in the batch tank for mixture with a predetermined quantity of milk powder, and the product emerging from the suction T returned to the batch tank. Using such a batch tank, the circulation through the system is continued a sufficient time to incorporate the powder in solution, and the finished product is then drawn from the batch tank.

Such a system is shown in the attached drawings, which illustrate devices embodying the principles of this invention and suitable for carrying out the method thereof and achieving the products herein described.

In the accompanying drawing (one sheet)—

Figure 3:
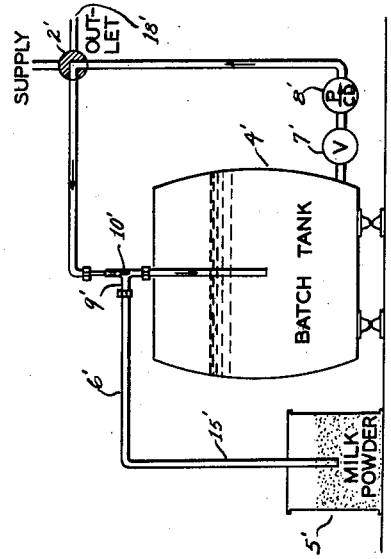
Figure 3 is a diagrammatic sketch of a system of apparatus alternative to the embodiment shown in Figure 1.

Reference will now be made to the parts of the drawings according to their designation by reference numerals.

Fluid at "holding temperature" is obtained from a supply source (not shown) and drawn from a supply pipe 1 through a three-way valve 2 and a down pipe 3 into a batch tank 4. The quantity of fluid as drawn is predetermined so that a mixture of the desired concentration will result when the contents of a drum 5 of milk powder are added thereto. Such drum 5 is opened but the contents are not disturbed except by the insertion of a suction tube 6; so milk powder will not be spread as dust throughout the manufacturing establishment. The suction tube 6 has sufficient travel, by reason of its own flexibility or rotation in its joints, to reach to the bottom of the drum 5.

The ingredient quantities being established at desired proportions, a batch tank valve 7 adjacent the bottom of the batch tank 4 is opened so as to permit the flow of the fluid from the batch tank 4 by gravity to a constant delivery pressure pump 8. In the present invention it has been found satisfactory, for relatively small scale production, to use a pump 8 having a rate of flow of 24,000 pounds per hour and 1½ inch diameter sanitary pipe.

From the delivery pump 8 the fluid is conducted through a lead to a suction T 9. Forming the fluid inlet to the suction T 9 is a jet nozzle 10, shown in cross-section in Figure 2. A nozzle satisfactory for the system described may be formed of 1 inch sanitary tubing at its inlet end 11, and reduced taperedly to a diameter of ⅝ inch at its outlet end 12. Such nozzles have been found to produce sufficient suction within the suction T 9 as, when supplied with fluid under pressures of 15 pounds to 20 pounds per square inch over atmospheric, will suck milk powder from the drum 5 at rates from 20 pounds to nearly 50 pounds per minute. The rate of flow is quite uniform once the nozzle shape is finally determined, and the fluid pressure and height of lift of the powder definitely set.

Figure 1:
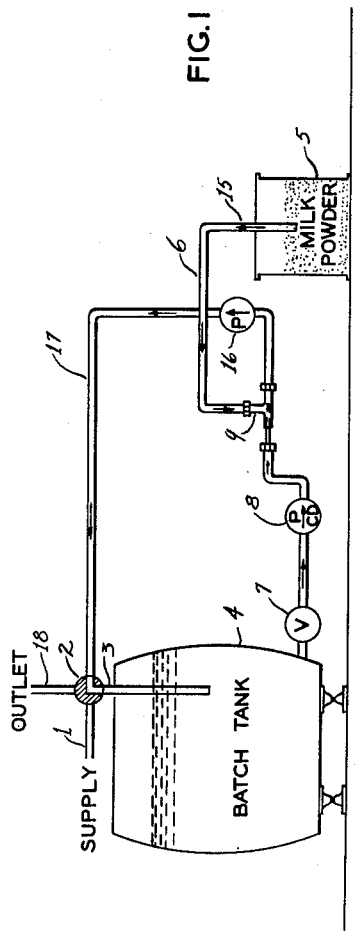
Figure 1 is a diagrammatic sketch of a preferred device or system of apparatus for carrying out the method and making the products of this invention.
Figure 2:
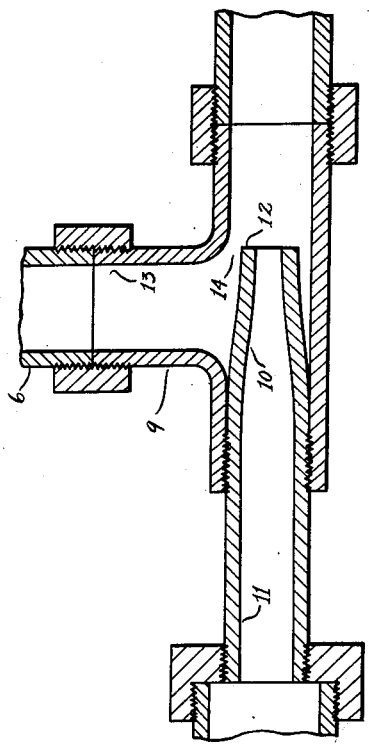
Figure 2 is an enlarged fragmentary sectional view of the T and nozzle shown in Figure 1.

The sanitary suction tube 6 connects with the sanitary suction inlet 13 of the sanitary suction T 9 and communicates with a sanitary suction chamber 14 annularly surrounding the jet nozzle 10 and the fluid jet which emerges therefrom. Where the jet nozzle 10 is aligned substantially horizontally within the suction T 9, as shown in Figures 1 and 2, I have found it advisable to locate the suction inlet 13 at the upper side of the suction T 9. Any fluid which may drip from the nozzle 10 into the suction chamber 14 cannot therefore bring about a premature wetting of the milk powder at the suction inlet 13.

Milk powder is notoriously difficult to handle in the presence of moisture because when outer particles of powder are wetted they tend to seal up within them unwetted particles. Heretofore this quality of milk powder has been thought to require much agitation for mixing of the powder into the fluid and for the avoidance of large doughy aggregations of powder. One of the essential steps of the new process here described is to loosen the milk powder particles so that they separate from each other before wetting. This is done by the suction created in chamber 14 of the suction T 9 and by the resistance to suction formed by the force of gravity acting upon the individual milk particles. The suction tube 6 is therefore provided with a feed end 15 having a vertical rise, in which gravity helps to loosen the particles from each other. The feed end 15 is filled by the particles as they are sucked toward the suction T 9, but by loosened particles rather than by compacted ones. Such loosened particles are drawn into the chamber 14 and there separately entrained in and enveloped by the high velocity jet stream whose energy, as it emerges from the nozzle 10, is tremendous. They are mixed in the jet stream by its own force in the absence of air, into stable solution without any physical agitation and at a rate which has heretofore been thought impossible of achievement.

The mixture is then returned to the batch tank 4 through the three-way valve 2, which is shown in Figure 1 in position to permit such return flow. The fluid from the batch tank 4 may be re-circulated through the system by means of the constant delivery pump 7 and the return pump 16 until the desired quantity of the milk powder from the drum 5 has been drawn into the solution with fluid. If only a small quantity of powder is being added to a large quantity of fluid, a better degree of uniformity of the fluid solution may be achieved by continuing for a short period circulating the fluid through the system back to the batch tank, even after no powder is being added.

The fluid in solution constitutes the final product, ready for canning and sterilization. It may be drawn from the batch tank 4 in the system illustrated, by setting the three-way valve 2 in position connecting the return line 17 with the outlet line 18, and utilizing the pumps 7, 16.

The sole function of the return pump 16 is to return the fluid passing out of the nozzle outlet 12 to the batch tank 4. Thus, this pump 16 may be of the positive displacement type; although a centrifugal pump, which agitates the fluid, may be used without disadvantage.

In Figure 3 is illustrated an alternative embodiment utilizing but one pump 7 which draws the fluid from the batch tank 4′, raises the fluid, and puts it under pressure before supplying it to the nozzle 10′ of the suction T 9′. In this embodiment the suction T 9′ is located above the level of the batch tank 4′ and the nozzle 10′ points downward, so that the return flow to the batch tank 4′ is accomplished. Milk powder from the drum 5′ is raised through the vertical portion 15′ of the suction tube 6′, and is entrained and mixed into solution within the suction T 9′ in the manner heretofore described.

After a batch has been reconstituted, it is driven by the same pump 7′ out through the outlet 18′, the three-way valve 2′ being first set to appropriate position. It may be noted that with the suction T 9′ holding the jet nozzle 10′ in vertically downward position, as shown in Figure 3, there is no danger of fluid dripping from the nozzle outlet into the end of the suction tube 6.

Using a high-velocity jet of fluid, I have found that there is no danger of clogging by reason of fluid dripping into the suction lead opening, or from normal variation in consistency of the milk powder being fed thereto. The force of the jet is not only sufficient to keep it entirely free from any tendency to clog, but also apparently sufficient to disintegrate into particles any conglomerated masses of milk powder. The process has in these respects proved to be entirely reliable and stable.

The foregoing description has indicted the suitability of the process for reconstitution by batches of product. So precisely metered is the flow of the milk powder into the fluid, however, that continuous production is feasible, without recirculation, after the nozzle and pump flow characteristics have been established to give the desired mixture of ingredients. For example, with the set-up described the pump and nozzle being so balanced as to add 10% of milk powder to 90% of fluid, reconstituted skim milk of the consistency of evaporated skim milk can be produced at the suction T outlet by pumping fresh skim milk as the fluid and using powdered non-fat milk; and, if desired, a product equivalent to fresh skim milk can be produced at the suction T outlet by using water as the fluid. If the former product is produced, it can be made into the equivalent of evaporated filled milk by adding vegetable fat and synthetic vitamins, and homogenizing.

By minor adjustment of the balance between the pump and the nozzle, a somewhat greater proportion of milk powder may be added, so that, using whole milk powder with water, a product equivalent to whole milk will be produced at the suction T outlet. Using whole milk as the fluid and whole milk powder, the product at the suction T outlet tube will be equivalent to evaporated whole milk, ready for canning and sterilization; or the same result can be had by first reconstituting whole milk powder with water to the consistency of whole milk and using that fluid product again in the system with whole milk powder so that the second time the resultant is equivalent to evaporated milk.

The principal advantage of the present invention is to provide flexibility to the dairy industry in utilizing milk powders, often available at low prices, and inexpensive equipment, to supplement or take the place of evaporating equipment. Thus, the following products are readily made, in the same manner as described, with modifications in ingredients as follows:

(1) The equivalent of condensed whole milk, by fortifying cold whole milk with whole milk powder, using enough whole milk powder to obtain a final test of 25.9% total solids including 7.9% milk fat.

(2) The equivalent of condensed whole milk, by reconstituting 25.9% whole milk powder with 74.1% cold water.

(3) The above-described equivalent of condensed skim milk, by fortifying cold skim milk with enough non-fat milk powder to obtain a final test of 20% solids not fat.

(4) The equivalent of condensed skim milk, by reconstituting 20% non-fat milk powder with cold water.

(5) The equivalent of evaporated filled milk, by fortifying cold skim milk with non-fat milk powder, adding vegetable fat and homogenizing, to obtain a final test of 26.15% total solids including 6% fat.

(6) The equivalent of evaporated filled milk, by reconstituting non-fat milk with cold water, adding vegetable fat and homogenizing, to obtain a final test of 26.15% total solids including 6% fat.

(7) The equivalent of concentrated skim condensed milk, by fortifying cold skim milk with non-fat milk powder to such consistency as is desired.

(8) The equivalent of concentrated skim condensed milk, by reconstituting non-fat milk powder with cold water to such consistency as is desired.

While dairymen will appreciate the advantage of using cold fluids in these products, the process will, of course, function using fluids at higher temperatures, but without the same inhibition on bacterial development; and there is no reason why, considering the efficiency of the process, cold fluids should not be used in all the foregoing products.

A commercially-acceptable equivalent to evaporated milk must possessess good flavor, color, consistency, low bacteria count, and must show no apparent sedimentation after standing, canned, for several months. All the products referred to herein have that full degree of acceptability for the milk products of evaporation of which they are equivalent in ingredients.

While throughout this specification and claims the term "solution" is used, it is recognized that milk, whether whole, evaporated or reconstituted is in some sense a solution, in some a suspension, and where milk fat is present, an emulsion. It is customary to apply the term "solution" to a reconstituted product, when no objectionable sedimentation occurs on standing. It is in this sense that the term is used herein.

For purposes of the claims, the term "cold" refers to fluid at holding temperatures at which dairy products may desirably be kept to inhibit bacterial growth, presently considered to be approximately 40° F. It is to be distinguished from "room" temperature, approximately 70° F., at which attempts to reconstitute milk powder have heretofore been made, but not with success on a commercial scale, and from elevated temperatures of approximately 110° F. which are usually considered necessary for successful commercial-scale reconstitution.

The term "milk products of evaporation" refers to those milk products which have been concentrated by evaporation, including evaporated whole milk, skim milk, filled milk, and condensed milk, with or without additive ingredients.

The term "watery" as used herein means fluids whose principal fluid constituent is water.

I claim:

1. A process for mixing powdered milk into stable solution with a potable watery fluid, comprising the steps of establishing the temperature of a potable watery fluid at a safe holding temperature for dairy products, passing the fluid in a stream through a venturi T having a suction inlet, thereby accelerating the fluid flow and reducing the pressure of the fluid stream to a value below atmospheric pressure, whereby suction is created in the suction inlet of the venturi T, interposing a supply of milk powder between such suction inlet of the venturi T and the pressure of the atmosphere, by such suction, loosening its particles and drawing the separated particles of such milk powder into the accelerated stream, and entraining such milk powder particles into solution with the fluid stream.

2. A batch process for reconstituting powdered milk to a desired concentration with a supply of milk powder, comprising the steps of claim 1, the supply of milk powder being first proportioned with respect to the supply of fluid so that their mixture will be in the concentration desired, together with the additional step of recirculating the fluid through the T until the entire supply of powder has been entrained into and mixed uniformly with the supply of fluid.

3. A process for separating from each other dry powder particles of a type having a tendency to cohere when moistened, and for bringing them into a uniform mixture with a liquid, comprising the steps of passing a stream of liquid through a mixing zone, accelerating the flow of said stream and thereby reducing the pressure in said mixing zone to sub-atmospheric pressure, utilizing such sub-atmospheric pressure to lift dry powder particles against the force of gravity and thereby loosen them from each other, further utilizing such sub-atmospheric pressure to draw the loosened particles into the mixing zone, and separately entraining the particles of powder within the accelerated stream wherein said particles are enveloped without cohering and are uniformly intermixed within the accelerated stream.

4. A device for entraining and mixing within a fluid, powder particles which must be separated before being moistened, comprising means for supplying fluid under greater than atmospheric pressure, a fluid conduit leading therefrom to a reduced area orifice whereby fluid may be accelerated and its pressure reduced to less than atmospheric pressure, said orifice opening into a mixing chamber having a suction inlet in the region wherein such pressure is so reduced, and a fluid outlet and a podwer supply conduit extending from a point below the level of the orifice and communicating with the reduced pressure region above the level of the orifice, whereby powder may be drawn downwardly into said reduced pressure region from a powder supply, entrained and mixed with the accelerated fluid.

5. A device for entraining and mixing within a fluid powder particles of a type which require loosening before admixture with a fluid and tend to cause foaming when so mixed, comprising means for supplying fluid under greater than atmospheric pressure, a suction venturi T connected therewith and adapted to accelerate the flow of fluid therefrom and reduce its pressure to less than atmospheric pressure, the T including a mixing chamber having a suction inlet in the region wherein such pressure is so reduced, said inlet being above the level of the fluid stream inlet into the T, a powder supply conduit communicating with the suction inlet and having a rise portion whereby powder may be drawn up from a powder supply and the particles thereof loosened from each other, such loosened powder particles being entrained and mixed in the mixing chamber with the accelerated fluid.

6. A device as defined in claim 5, together with a batch tank from which such fluid is supplied, and means communicating between said mixing chamber and batch tank for returning the mixture to said batch tank.

References Cited in the file of this patent

UNITED STATES PATENTS

| | | |
|---|---|---|
| 1,630,543 | Scott | May 31, 1927 |
| 2,039,275 | McGrael | Apr. 28, 1936 |
| 2,219,616 | Bradshaw et al. | Oct. 29, 1940 |
| 2,375,833 | Urquhart | May 15, 1945 |
| 2,384,998 | Haugh | Sept. 18, 1945 |
| 2,399,565 | North et al. | Apr. 30, 1946 |
| 2,473,474 | Keane | June 14, 1949 |
| 2,503,866 | Chrysler et al. | Apr. 11, 1950 |